United States Patent
Yamamoto et al.

(10) Patent No.: US 11,104,826 B2
(45) Date of Patent: Aug. 31, 2021

(54) RELEASE-LINERED PRESSURE-SENSITIVE ADHESIVE SHEET

(71) Applicant: NITTO DENKO CORPORATION, Ibaraki (JP)

(72) Inventors: Shuuhei Yamamoto, Ibaraki (JP); Kiichiro Matsushita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 112 days.

(21) Appl. No.: 16/098,205

(22) PCT Filed: Apr. 10, 2017

(86) PCT No.: PCT/JP2017/014679
§ 371 (c)(1),
(2) Date: Nov. 1, 2018

(87) PCT Pub. No.: WO2017/191734
PCT Pub. Date: Nov. 9, 2017

(65) Prior Publication Data
US 2019/0144716 A1 May 16, 2019

(30) Foreign Application Priority Data
May 2, 2016 (JP) .............................. JP2016-092620

(51) Int. Cl.
*C09J 7/10* (2018.01)
*C09J 7/38* (2018.01)
(Continued)

(52) U.S. Cl.
CPC ................. *C09J 7/10* (2018.01); *C09J 7/203* (2018.01); *C09J 7/38* (2018.01); *C09J 7/403* (2018.01);
(Continued)

(58) Field of Classification Search
CPC ..... C09J 7/203; C09J 7/403; C09J 7/38; C09J 2201/622
See application file for complete search history.

(56) References Cited

U.S. PATENT DOCUMENTS 5,234,734 A 8/1993 Hamada
5,591,290 A * 1/1997 Walter .................. C09J 7/403
156/152

(Continued)

FOREIGN PATENT DOCUMENTS

CN 102378796 A 3/2012
JP 04-144798 A 5/1992
(Continued)

OTHER PUBLICATIONS

International Search Report for PCT/JP2017/014679 dated Jun. 6, 2017 [PCT/ISA/210].
(Continued)

*Primary Examiner* — Patricia L. Nordmeyer
(74) *Attorney, Agent, or Firm* — Sughrue Mion, PLLC

(57) ABSTRACT

Provided is a PSA sheet capable of providing greater air release properties. The present invention provides a release-linered PSA sheet comprising a PSA sheet and a release liner covering an adhesive face of the PSA sheet. The PSA sheet has a coating layer that partially forms the adhesive face. The release liner has an arithmetic average roughness of 0.1 µm or greater on the PSA sheet side surface.

18 Claims, 2 Drawing Sheets

(51) Int. Cl.
  *C09J 7/40* (2018.01)
  *C09J 7/20* (2018.01)
(52) U.S. Cl.
  CPC .... *C09J 2301/206* (2020.08); *C09J 2301/312* (2020.08); *Y10T 428/1486* (2015.01)

(56) References Cited

U.S. PATENT DOCUMENTS

| | | | |
|---|---|---|---|
| 6,197,397 | B1 | 3/2001 | Sher et al. |
| 6,565,697 | B1* | 5/2003 | Maercklein ................ C09J 7/38 156/289 |
| 2001/0031353 | A1* | 10/2001 | Hannington ............... C09J 7/10 428/343 |
| 2003/0091817 | A1* | 5/2003 | Amano ............... B32B 38/0036 428/343 |
| 2005/0064125 | A1 | 3/2005 | Tsukida et al. |
| 2008/0213527 | A1* | 9/2008 | Nonaka .................... C09J 7/403 428/41.8 |
| 2012/0148791 | A1 | 6/2012 | Yamanaka et al. |
| 2017/0260425 | A1 | 9/2017 | Yamamoto et al. |
| 2017/0267897 | A1 | 9/2017 | Yamamoto et al. |
| 2017/0335142 | A1 | 11/2017 | Yamamoto et al. |

FOREIGN PATENT DOCUMENTS

| | | |
|---|---|---|
| JP | 2000-044903 A | 2/2000 |
| JP | 2000-160117 A | 6/2000 |
| JP | 2001-234130 A | 8/2001 |
| JP | 2003-099749 A | 4/2003 |
| JP | 2003-531253 A | 10/2003 |
| JP | 2004-123961 A | 4/2004 |
| JP | 2005-200499 A | 7/2005 |
| JP | 2005-298543 A | 10/2005 |
| JP | 2006-070273 A | 3/2006 |
| JP | 2009-035618 A | 2/2009 |
| JP | 2010-138260 A | 6/2010 |
| JP | 2012-122027 A | 6/2012 |
| JP | 5570110 B2 | 8/2014 |
| JP | 2014-240446 A | 12/2014 |
| WO | 01/081013 A1 | 11/2001 |
| WO | 2010/091220 A1 | 8/2010 |
| WO | 2016/084946 A1 | 6/2016 |
| WO | 2016/084947 A1 | 6/2016 |
| WO | 2016/084948 A1 | 6/2016 |

OTHER PUBLICATIONS

Notification of Reasons for Refusal dated Mar. 5, 2020, from the Japanese Patent Office in Application No. 2016-092620.
The First Office Action dated Aug. 31, 2020, issued by the State Intellectual Property Office of the P.R.C. in application No. 201780026531.X.
Notification of Reasons for Refusal dated Feb. 19, 2021 from the Korean Intellectual Property Office in Application No. 10-2018-7034374.
The Second Office Action dated May 8, 2021 issued by the Chinese Patent Office in Chinese Application English No. 201780026531.X.

* cited by examiner

RELEASE-LINERED PRESSURE-SENSITIVE ADHESIVE SHEET

CROSS REFERENCE TO RELATED APPLICATIONS

This application is a National Stage of International Application No. PCT/JP2017/014679 filed Apr. 10, 2017, claiming priority based on Japanese Patent Application No. 2016-092620 filed May 2, 2016.

TECHNICAL FIELD

The present invention relates to a release-linered pressure-sensitive adhesive sheet.

This application claims priority to Japanese Patent Application No. 2016-092620 filed on May 2, 2016; the entire content thereof is incorporated herein by reference.

BACKGROUND ART

In general, pressure-sensitive adhesive (or PSA; the same applies hereinafter) has characteristics to be in a soft solid (viscoelastic) state in a room temperature range and easily adhere to adherend with some pressure. With the benefit of such properties, PSA is widely used in forms of substrate-supported PSA sheets having a PSA layer at least on one face of the substrate for purposes including fastening and surface protection of various articles and obtaining desirable appearances such as for decorative purposes. Documents disclosing these types of conventional art include Patent Documents 1 and 2.

CITATION LIST

Patent Literature

[Patent Document 1] Japanese Patent Application Publication No. 2006-70273
[Patent Document 2] Japanese Patent Application Publication No. 2000-160117

SUMMARY OF INVENTION

Technical Problem

With respect to conventional PSA sheets, when the PSA sheets are adhered to adherends, there have been cases where a fluid substance such as air is left between the PSA sheets and the adherends to form bubbles and the like (trapped air, etc.), thereby causing degradation of the appearances. Such bubbles and the like are not desirable, either, in view of their negative impact on the adhesive properties such as reduced adhesive strength. To prevent formation of the bubbles and the like or to provide features (or air release properties) to eliminate the sort of bubbles if formed, there is a known technique by which ridges are formed on the surface of a release liner that protects the adhesive face of a PSA sheet and the ridges are used to form grooves in the PSA layer surface (Patent Document 1). Air and the like that are to remain between the adhesive face and the adherend can be eliminated through the grooves formed in the surface of the PSA layer. Methods by which grooves are formed in the PSA layer surface as described in Patent Document 1 have a problem that depending on the thickness of the PSA layer, the depth of the grooves serving as pathways for air and the like is limited; and after removal of the release liner and the like to expose the adhesive face, if it takes time before its application to an adherend, the viscoelasticity of the PSA layer causes the grooves to fade or be lost, whereby no air release properties are obtained. In addition, when the PSA sheet is peeled off the adherend, there may be a tendency for the occurrence of leftover adhesive residue with the grooves serving as initiation points.

Patent Document 2 discloses partially laminating the surface of a PSA layer with a non-adhesive layer to obtain air release properties with the non-adhesive layer surface serving as pathways for air and the like. In view of lacking limitations on the PSA layer thickness, such a constitution is more advantageous than a constitution having grooves in the PSA layer as proposed in Patent Document 1. In this type of PSA sheet, to obtain greater air release properties for a certain application, etc., the surface area of non-adhesive layer is increased in its adhesive face. However, when the surface area of non-adhesive layer is increased, the exposed area of the PSA layer will decrease, leading to a decrease in adhesive strength. In a PSA sheet partially provided with a non-adhesive layer, there are trade-offs between air release properties and adhesive strength.

Accordingly, with respect to a PSA sheet in which a coating layer such as a non-adhesive layer is partially placed on the PSA layer surface, instead of increasing the coating layer surface, the present inventors have studied other methods to obtain greater air release properties. With focus on properties of the coating layer surface, it has been found that improved air release properties can be obtained without an increase in surface area of coating layer, whereby the present invention has been made. In other words, the present invention relates to improvement of a PSA sheet having a PSA layer surface partially provided with a coating layer as a means of releasing air with an objective to provide a PSA sheet capable of providing greater air release properties.

Solution to Problem

The present invention provides a release-linered PSA sheet comprising a PSA sheet and a release liner covering an adhesive face of the PSA sheet. The PSA sheet has a coating layer partially forming the adhesive face. The release liner has an arithmetic average roughness of 0.1 µm or greater on the PSA sheet side surface. According to such an embodiment, greater air release properties can be obtained as compared to one whose arithmetic average roughness is less than 0.1 µm. In a preferable embodiment, the release liner has an arithmetic average roughness greater than 1 µm on the PSA sheet side surface.

The present description also provides a PSA sheet comprising a PSA layer and a coating layer partially covering a surface of the PSA layer. In this PSA sheet, the coating layer surface has an arithmetic average roughness of 0.1 µm or greater. According to such an embodiment, greater air release properties can be obtained as compared to one whose arithmetic average roughness is less than 0.1 µm. Such a PSA sheet can be preferably made, using a release liner that has a release face having at least the prescribed arithmetic average roughness value.

In a preferable embodiment of the release-linered PSA sheet disclosed herein, the PSA sheet comprises a substrate film and a PSA layer provided at least on one face of the substrate film.

In a preferable embodiment, the PSA sheet disclosed herein has a surface area ratio of the coating layer to the adhesive layer lower than 50%. Such an embodiment can preferably combine adhesive properties such as adhesive strength and air release properties.

In a preferable embodiment of the PSA sheet disclosed herein, the adhesive face has a 180° peel strength of 2 N/20 mm or greater. According to the art disclosed herein, while obtaining air release properties with the coating layer provided, at least a certain level of adhesive strength can be obtained as well.

DESCRIPTION OF EMBODIMENTS

Figure 1:
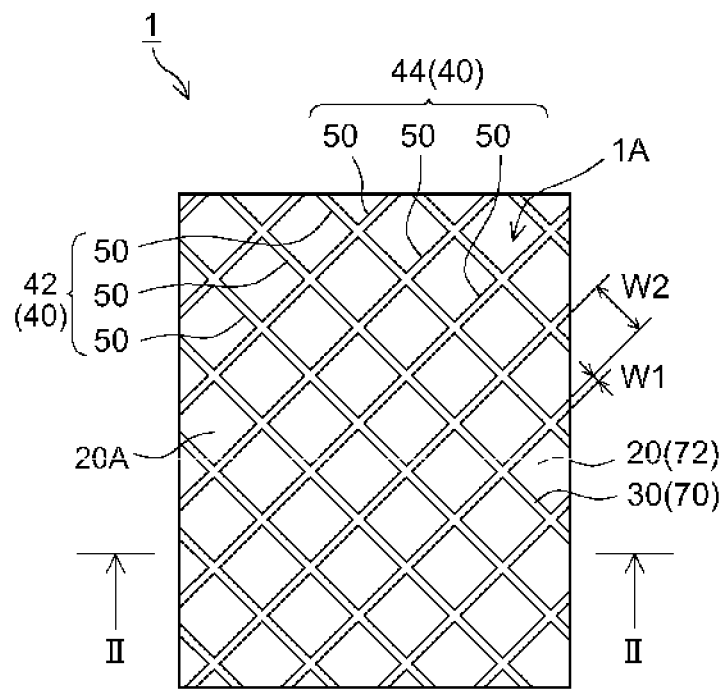
FIG. 1 shows a schematic top view of the PSA sheet according to an embodiment.

Preferred embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet of the present invention provided as an actual product.

The concept of PSA sheet herein encompasses so-called PSA tapes, PSA labels, and PSA films. The PSA sheet disclosed herein can be in a roll form or in a flat sheet form. Alternatively, the sheet may be further processed into various forms.

Figure 2:
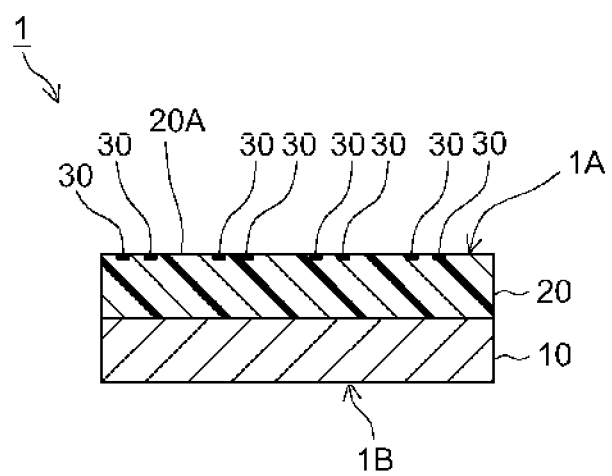
FIG. 2 shows a cross-sectional diagram at line II-II in FIG. 1.

FIG. 1 shows a schematic top view of the PSA sheet according to an embodiment. FIG. 2 shows a cross-sectional diagram at line II-II in FIG. 1. With reference to the drawings, the PSA sheet in this embodiment is described.

As shown in FIGS. 1 and 2, PSA sheet 1 according to this embodiment has a layered structure formed of a substrate film 10 and a PSA layer 20. Substrate film 10 supports the PSA layer 20. In PSA sheet 1, the surface 20A on the PSA layer 20 side forms an adhesive face 1A. The other face 1B (the surface on the substrate film 10 side) of PSA sheet 1 is a non-adhesive face.

On the surface 20A of the PSA layer 20, a coating layer 30 is partially placed. In other words, the PSA layer surface 20A is partially covered with the coating layer 30. When PSA sheet 1 is applied to an adherend, the coating layer 30 forms pathways for air and the like between the PSA sheet 1 and the adherend, whereby air release properties are provided.

The coating layer 30 has a prescribed pattern (coating layer pattern) 40 on the adhesive face 1A of the PSA sheet 1. In this embodiment, the coating layer 30 is in a lattice pattern 40. In particular, the lattice pattern 40 of the coating layer 30 is formed of the first stripe pattern 42 and the second stripe pattern 44 that is placed to intersect the first stripe pattern 42 on the adhesive face 1A of the PSA sheet 1.

The first stripe pattern 42 is formed of parts 50 (linearly extending parts, bands in this embodiment) that run straight from one edge to another edge of the adhesive face 1A. These linearly extending parts 50 are placed in parallel, spaced at intervals arranged in the width direction. In this embodiment, the linearly extending parts 50 are placed at an angle such that their length directions intersect the edges (ends, limits) of the width direction of PSA sheet 1, with each part reaching two edges (two sides) of the adhesive face 1A.

Similar to the first stripe pattern 42, the second stripe pattern 44 is also formed of parts 50 (linearly extending parts, bands in this embodiment) that run straight from one edge to another edge of the adhesive face 1A. These linearly extending parts 50 are placed in parallel at intervals arranged in the width direction. In this embodiment, the linearly extending parts 50 are placed at an angle such that their length directions intersect the edges of the width direction of PSA sheet 1, with each part reaching two edges (two sides) of the adhesive face 1A. In this embodiment, the linearly extending parts 50 are straight bands, but are not limited thereto. Each linearly extending part may be curvilinear. In such an embodiment, the several linearly extending parts may form a wavy stripe pattern, etc. The number of the linearly extending parts (the number of lines) may depend on the shape, size, etc., of the adhesive face of the PSA sheet; and therefore, it is not limited to a particular number.

In this embodiment, the first stripe pattern 42 and the second stripe pattern 44 intersect each other so that the linearly extending parts 50 of the first stripe pattern 42 and the linearly extending parts 50 of the second stripe pattern 44 cross one another almost perpendicularly. Thus, the linearly extending parts 50 of the first stripe pattern 42 partially overlap the linearly extending parts 50 of the second stripe pattern 44.

Herein, the lattice pattern typically refers to a pattern that includes two stripe patterns intersecting each other and encompasses not only a rhombic lattice as in the present embodiment, but also various lattice shapes such as a square lattice and a triangular lattice. When the linearly extending parts are straight, the angle (the acute angle) at an intersection of the two stripe patterns can be, for instance, in a range from 10° to 90° (preferably 45° to 90°, typically 60° to 90°). The lattice pattern disclosed herein also encompasses a pattern that includes a stripe pattern formed of several linearly extending parts with repeated bending, for instance, a pattern such as a hexagonal lattice. In such a pattern, adjacent linearly extending parts may be partially connected to one another. From the standpoint of the air release properties, the coating layer preferably comprises one, two or more stripe patterns. The coating layer pattern (typically a lattice pattern) may include a third stripe pattern.

The width (W1) of each linearly extending part 50 of the coating layer 30 is about 200 μm in the present embodiment, but is not limited to this. In a preferable embodiment, the width (W1) of each linearly extending part of the coating layer is in a range of 0.1 mm to 2 mm. This can combine high adhesive strength and good air release properties. From the standpoint of enhancing the air release properties, the width (W1) of the linearly extending part is more preferably 0.2 mm or greater, yet more preferably 0.3 mm or greater, or particularly preferably 0.5 mm or greater. In another preferable embodiment, the width (W1) of each linearly extending part of the coating layer is about 10 μm or greater. From the standpoint of the air release properties, the width (W1) of each linearly extending part of the coating layer is preferably 50 μm or greater, more preferably 100 μm or greater, or yet more preferably 150 μm or greater. From the standpoint of the adhesive strength, the appearance, etc., the width (W1) of the linearly extending part is more preferably 1.2 mm or less, yet more preferably 1.0 mm or less, even more preferably 0.7 mm or less, particularly preferably 0.5 mm or less, or most preferably 0.4 mm or less. The width (W1) of a linearly extending part of the first stripe pattern can be equal to or different from the width (W1) of a linearly extending part of the second stripe pattern.

In a preferable embodiment, from the standpoint of the air release properties, a linearly extending part has a ratio (W/T) of its width W to its thickness T of about 50 or higher. The ratio (W/T) is more preferably about 80 or higher, or yet more preferably 100 or higher, typically 120 or higher. From the standpoint of the balance between air release properties and adhesion, the ratio (W/T) is preferably about 500 or lower (e.g. 200 or lower, typically 165 or lower).

The intervals (W2) between the linearly extending parts 50 forming the first stripe pattern 42 of the coating layer 30 are about 18 mm in this embodiment and the same applies to the intervals (W2) between the linearly extending parts 50 forming the second stripe pattern 44, but neither is limited to this. The intervals (W2) between the linearly extending parts forming the first stripe pattern are preferably in a range of 1.0 mm to 10 mm. By this, there is a higher tendency that high adhesive strength is combined with air release properties in a well-balanced manner. Here, the intervals (W2) between the linearly extending parts refer to the widths of spaces present between any two adjacent linearly extending parts in the adhesive face of the PSA sheet. From the standpoint of increasing the adhesive strength, etc., the intervals (W2) between the linearly extending parts are more preferably 1.5 mm or greater, or yet more preferably 2.5 mm or greater. The intervals (W2) between the linearly extending parts can be about 8 mm or less (e.g. 5 mm or less, typically 3 mm or less). The intervals (W2) between the linearly extending parts forming the second stripe pattern can also be preferably selected from the ranges exemplified for the intervals (W2) between the linearly extending parts forming the first stripe pattern. The intervals (W2) are preferably evenly spaced. The intervals (W2) between the linearly extending parts forming the first stripe pattern can be equal to or different from the intervals (W2) between the linearly extending parts forming the second stripe pattern.

From the standpoint of combining well-balanced adhesive strength and air release properties, the pitch of the linearly extending parts is preferably in a range of 1 mm to 20 mm. The pitch of the linearly extending parts is more preferably 1.5 mm or greater, yet more preferably 2 mm or greater, for instance, 2.5 mm or greater. The pitch of the linearly extending parts is more preferably 15 mm or less (e.g. 12 mm or less), or yet more preferably 5 mm or less. The pitch refers to the distance (interval) between the centerlines of the width directions (i.e. the lengthwise centerlines) of the linearly extending parts.

With focus on the surface 20A of the PSA layer 20, the embodiment above can be described such that the surface 20A of the PSA layer 20 has a coating layer-bearing area 70 where the coating layer 30 is placed and a coating layer-free area 72 where the PSA layer 20 is exposed on the outer surface without the coating layer 30. The features (shape, arrangement, relative position, size, etc.) of the coating layer-bearing area 70 in the PSA layer surface 20A are the same with the features of the coating layer 30 in the adhesive face 1A of the PSA sheet 1. Thus, the coating layer-bearing area 70 is in a pattern (a lattice pattern) that has the same features as the coating layer pattern 40 with a first stripe pattern having the same features as the first stripe pattern 42 and a second stripe pattern having the same features as the second stripe pattern 44. The first stripe pattern of the coating layer-bearing area 70 has linearly extending parts that have the same features as the linearly extending parts 50 that the first stripe pattern 42 has. The second stripe pattern of the coating layer-bearing area 70 has linearly extending parts that have the same features as the linearly extending parts 50 that the second stripe pattern 44 has. Thus, details of the features of the coating layer-bearing area 70 and the coating layer-free area 72 are omitted here.

Figure 3:
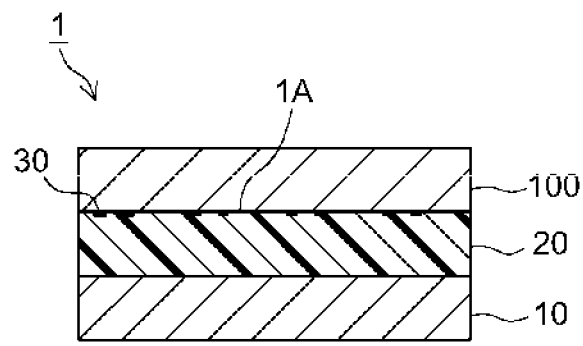
FIG. 3 shows a schematic cross-sectional diagram of the release-linered PSA sheet according to an embodiment.

Before used, as shown in FIG. 3, the PSA sheet 1 may be in a form of a release liner-backed PSA sheet 1 protected with a release liner 100 having a release face on the adhesive face 1A side. Alternatively, it may be in a form such that the back face (opposite from the PSA layer 20 side surface) of substrate film 10 is a release face and the PSA sheet 1 is wound so that the back face is brought into contact with the PSA layer 20 whereby the PSA layer 20 is protected with the back face of the substrate film 10. Such an adhesively single-faced PSA sheet (single-faced PSA sheet) having only one adhesive face is favorable, for instance, when the surface opposite from the adhesive face requires features such as decoration and surface protection, or when it is used as a paint substitute sheet.

Figure 4:
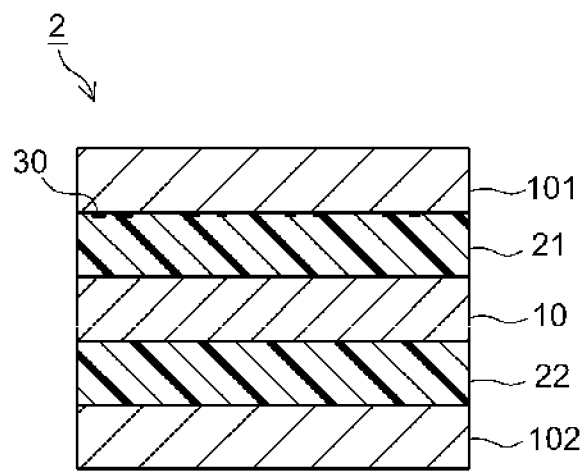
FIG. 4 shows a schematic cross-sectional diagram of the release-linered PSA sheet according to another embodiment.

When the PSA sheet disclosed herein is an adhesively double-faced substrate-backed PSA sheet (a double-faced PSA sheet) as shown in FIG. 4, the PSA sheet 2 may be in an embodiment such that the respective faces (both non-releasable) of substrate film 10 are provided with PSA layers 21 and 22 with the PSA layers 21 and 22 protected with release liners 101 and 102, respectively, with each liner having a release face at least on the PSA layer side. In the PSA sheet 2, a coating layer 30 is partially placed only on the surface of the PSA layer 21, and no coating layer is formed on the PSA layer 22; however, coating layers 30 may be partially formed on the respective surfaces of PSA layers 21 and 22. Although not specifically shown in a drawing, the double-faced PSA sheet may be in an embodiment such that PSA layers are provided to the respective faces (both non-releasable) of the substrate film and one of the PSA layers is protected with a release liner having a release face on each side. By winding the PSA sheet so that the other PSA layer is brought into contact with the back face of the release liner, this type of PSA sheet can be made into an embodiment where the two PSA layers are protected with the one release liner. In addition, the PSA sheet disclosed herein can be in an embodiment of a substrate-free double-faced PSA sheet consisting of a PSA layer. In this case, the coating layer can be provided to one or each face of the PSA layer. The double-faced PSA sheet is preferably used, for instance, for bonding/fixing applications.

<Properties of PSA Sheet, Etc.>

In the PSA sheet disclosed herein, the % surface area of the coating layer-free area in the PSA layer surface (which can be the % surface area of where the PSA layer is exposed) is suitably higher than 50%, or preferably 70% or higher. This can ensure good adhesive strength. The % surface area is more preferably 75% or higher, or yet more preferably 80% or higher. In other words, the % surface area of the coating layer in the adhesive face of the PSA sheet is suitably lower than 50%, preferably 30% or lower, more preferably 25% or lower, or yet more preferably 20% or lower. From the standpoint of obtaining good air release properties, the % surface area of the coating layer-free area in the PSA layer surface is preferably 90% or lower, or more preferably 85% or lower. In other words, the % surface area of the coating layer in the adhesive face of the PSA sheet is preferably 10% or higher, or more preferably 15% or higher.

In a preferable embodiment, the adhesive face (typically formed of the exposed PSA layer surface and the coating layer surface) of the PSA sheet shows a 180° peel strength of 1 N/20 mm or greater. The 180° peel strength is preferably 2 N/20 mm or greater, for instance, 5 N/20 mm or greater. The 180° peel strength can be determined by the method described next. In particular, the PSA sheet is cut to a 20 mm wide by 100 mm long size to obtain a measurement sample; and in an environment at 23° C. and 50% RH, the adhesive face of the measurement sample is press-bonded to the surface of a stainless steel plate (SUS 304BA plate) with a 2 kg roller moved back and forth once. This is left standing in the same environment for 30 minutes. Subsequently, using a universal tensile/compression tester, based on JIS Z0237:2000, the peel strength (N/20 mm) is determined at a tensile speed of 300 mm/min at a peel angle of 180°.

In a preferable embodiment, the adhesive face (typically formed of the exposed PSA layer surface and the coating layer surface) of the PSA sheet shows a liner peel strength (peel strength to release liner) of less than 1 N/50 mm (e.g. 0.5 N/50 mm or less, typically 0.4 N/50 mm or less). With respect to the PSA sheet having a liner peel strength at or below the prescribed values, the release liner can be easily removed, thereby facilitating the application work. It is also preferable to have not too high a liner peel strength from the standpoint of reducing wrinkling and displacement of the coating layer while the release liner covering the adhesive face is being removed from the adhesive face. In view of a possibility of degraded work efficiency when the liner peel strength is excessively low, the adhesive face of the PSA sheet preferably has a liner peel strength of about 0.01 N/50 mm or greater. The liner peel strength is determined based on JIS Z0237:2000 at a tensile speed of 300 mm/min at a peel angle of 180° in an environment at 23° C. and 50% RH.

In a preferable embodiment, the PSA sheet is transparent (including semi-transparency). In such a PSA sheet, when bubbles and the like are trapped between the PSA sheet and an adherend, they are visible through the PSA sheet and are likely to degrade the appearance. The art disclosed herein prevents formation of the sort of bubbles between the PSA sheet and the adherend; and therefore, an excellent appearance can be obtained in a transparent PSA sheet. That the PSA sheet is transparent means that the components (PSA layer, coating layer, etc.) of the PSA sheet are transparent. Herein, that the PSA sheet and its components (PSA layer, coating layer, etc.) are transparent may mean that the PSA sheet and its components show a total light transmittance of 50% or higher, specifically 80% or higher (e.g. 90% or higher, typically 95% or higher). The PSA sheet preferably has a haze value of 10% or lower (e.g. 5% or lower). The total light transmittance and the haze value are determined based on JIS K7136:2000 using a commercial transmissometer (e.g. product name HAZE METER HM-150 available from Murakami Color Research Laboratory). The total light transmittance and the haze value of the substrate film described later are also determined by the same methods.

The overall thickness of the PSA sheet disclosed herein (including the PSA layer and the substrate, but excluding the release liner) is not particularly limited. It is suitably about 2 μm or greater, or preferably 5 μm or greater, for instance, 10 μm or greater, typically 30 μm or greater. The overall thickness is suitably about 1000 μm or less, preferably 500 μm or less (e.g. 300 μm or less, typically 100 μm or less). In a preferable embodiment, the PSA sheet has an overall thickness of 50 μm or less, or more preferably 30 μm or less, for instance, 15 μm or less, typically 5 μm or less. According to the art disclosed herein, good air release properties can be obtained even when the PSA sheet is limited in overall thickness as described above. The PSA sheet limited in overall thickness can be advantageous in view of making products to which the PSA sheet is applied smaller, lighter, resource-saving, and so on.

The tolerance for thickness of the PSA sheet disclosed herein is preferably 50% or less. The PSA sheet with a small tolerance for thickness can exhibit greater adhesive properties. The tolerance for thickness is more preferably 40% or less, yet more preferably 30% or less, or particularly preferably 20% or less. The tolerance for thickness of the PSA sheet is determined by the method described next. In particular, with respect to the PSA sheet subject to measurement, using a dial gauge, at 10 points in the coating layer-bearing area and 10 center points in the coating layer-free area, the thickness is measured. The maximum value $T_M$ (μm) and the standard thickness $T_S$ (μm) of the thickness values are substituted into a formula $(T_M - T_S)/T_S \times 100$ and the resulting value is used as the tolerance (%) for thickness. When the coating layer has a lattice pattern, the thickness is preferably measured at 10 points of intersection in the coating layer lattice and 10 center points of rectangular areas with the exposed PSA layer surrounded by the coating layer in the lattice pattern.

<Release Liner>

The release liner (release film) disclosed herein has an arithmetic average roughness of 0.1 μm or greater on the release face (on the surface to be in contact with the adhesive face (coating layer-bearing adhesive face) of the PSA sheet). A release liner having such a feature is used in the release-linered PSA sheet disclosed herein. When the release face of the release liner has an arithmetic average roughness of 0.1 μm or greater, the contours (depressions and protrusions) indicated by the roughness value are transferred to the coating layer surface opposing the release face. By this, when the adhesive face of the PSA sheet is adhered to an adherend, a void is formed between the coating layer and the adherend to facilitate the air passage, thereby bringing about greater air release properties. The arithmetic average roughness is preferably 0.2 μm or greater, for instance, greater than 1 μm (1.0 μm in particular). The structure of the release liner's release face can be transferred to the PSA layer surface forming the adhesive face; and therefore, from the standpoint of the adhesive properties, etc., it is suitable that the arithmetic average roughness is about 5 μm or less. The arithmetic average roughness can be adjusted by subjecting the surface of the release liner (typically a release liner substrate) to a process such as roller embossing and sandblasting. For instance, sandblasting or a rolling process with a sandblasted roll is employed to form irregular contours on the release liner's release face. Alternatively, after a roughened layer is formed (e.g. possibly from grain-containing ink) on the release liner surface, release treatment can be provided over it to adjust the release liner's release face to an arithmetic average roughness of 0.1 μm or greater. Here, the arithmetic average roughness can be determined, using a general surface roughness gauge (e.g. non-contact three-dimensional surface profilometer under model name WYKO NT-3300 available from Veeco). The same method is employed in the working examples described later.

As the release liner, any conventional release paper or the like can be used without any particular limitations. For example, a release liner having a release layer on a surface of a liner substrate such as resin film (polyethylene terephthalate (PET), etc.) and paper; a release liner formed from a low-adhesive material such as a fluorine-based polymer (polytetrafluoroethylene, etc.) or a polyolefin-based resin (polyethylene (PE), polypropylene (PP), etc.); or the like can be used. Favorable examples of the release liner disclosed herein include a release liner having a release layer at least on one face of polyester film such as PET, and paper (high-quality paper) laminated with plastic film (e.g. PE resin) on each side. The release layer can be formed, for instance, by subjecting the liner substrate to a surface treatment with a release agent such as a silicone-based, a long-chain alkyl-based, a fluorine-based, a molybdenum disulfide-based release agent or the like.

Figure 5:
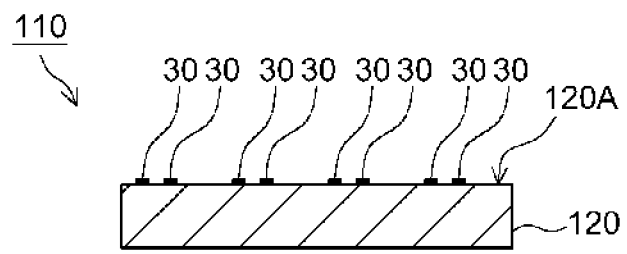
FIG. 5 shows a schematic cross-sectional diagram of the release liner for the PSA sheet according to an embodiment.

As shown in FIG. 5, the release liner used in fabricating the PSA sheet disclosed herein may be a coating layer-bearing release liner 110 that comprises a releasable support 120 having a release face 120A. The releasable support 120 may have a release layer at least on one face of a liner substrate, or it can be a support formed from a low-adhesive material. The release face 120A of the releasable support 120 is provided with a coating layer 30 that can be transferred to a PSA sheet. In other words, the coating layer 30 is arranged on the release face 120A in a state that it can be separated from the release face 120A by an adhesive strength of PSA, etc. With the use of such release liner 110 having a transferrable coating layer 30 on the surface, the PSA sheet disclosed herein is preferably fabricated. The features (shape, arrangement, relative position, size, pattern, etc.) of the coating layer provided to the release face of the releasable support are basically the same as the features of the coating layer on the adhesive face of the PSA sheet described earlier. Thus, details are omitted. When the liner substrate has a release layer on each face thereof, from the standpoint of the ease of removal, etc., the peel strength may be varied between the respective release faces; for instance, the release face on which the coating layer is formed can have a lower peel strength than the release face on the opposite side. The peel strength can be determined by the same method as for the liner peel strength.

The thickness (overall thickness) of the release liner is not particularly limited. From the standpoint of the ease of removal, handling properties, strength, etc., it is preferably about 10 μm or greater (e.g. 15 μm or greater); it is preferably about 500 μm or less (e.g. 100 μm or less).

<Psa Layer>

The PSA layer disclosed herein typically refers to a layer formed of a material (PSA) that exists as a soft solid (a viscoelastic material) in a room temperature range and has a property to adhere easily to adherend with some pressure applied. As defined in "*Adhesion Fundamental and Practice*" by C. A. Dahlquist (McLaren & Sons (1966), P. 143), the PSA referred to herein can be generally a material that has a property satisfying complex tensile modulus $E^*(1\ Hz) < 10^7$ dyne/cm² (typically, a material that exhibits the described characteristics at 25° C.).

The PSA layer disclosed herein may comprise, as its base polymer, one, two or more species among acrylic polymers, rubber-based polymers, polyester-based polymers, urethane-based polymers, polyether-based polymers, silicone-based polymers, polyamide-based polymers, fluorine-based polymers, etc. From the standpoint of the adhesive properties (e.g. peel strength, repulsion resistance), molecular design, etc., acrylic polymers can be preferably used. In other words, the PSA layer is preferably an acrylic PSA layer that comprises an acrylic polymer as its base polymer. The "base polymer" of a PSA refers to the primary component (typically, a component accounting for more than 50% by weight) among polymers in the PSA.

As the acrylic polymer, for example, a polymer of a monomeric starting material comprising an alkyl (meth)acrylate as a primary monomer and possibly comprising a secondary monomer copolymerizable with the primary monomer is preferable. The primary monomer here refers to a component that accounts for higher than 50% by weight of the monomer composition in the monomeric starting material.

As the alkyl (meth)acrylate, for instance, a compound represented by the following formula (1) can preferably be used:

$$CH_2=C(R^1)COOR^2 \qquad (1)$$

Herein, $R^1$ in the formula (1) is a hydrogen atom or a methyl group. $R^2$ is a acyclic alkyl group having 1 to 20 carbon atoms (hereinafter, such a numerical range of carbon atoms may be indicated as "$C_{1-20}$"). From the standpoint of the storage elastic modulus of the PSA, etc., an alkyl (meth)acrylate having a $C_{1-12}$ (e.g. $C_{2-10}$, typically $C_{4-8}$) acyclic alkyl group for $R^2$ is preferable. For the alkyl (meth)acrylate having a $C_{1-20}$ acyclic alkyl group for $R^2$, solely one species or a combination of two or more species can be used. Preferable alkyl (meth)acrylates include n-butyl acrylate and 2-ethylhexyl acrylate.

The secondary monomer copolymerizable with the alkyl (meth)acrylate as the primary monomer may be useful in introducing crosslinking points into the acrylic polymer and increasing the cohesive strength of the acrylic polymer. As the secondary monomer, one, two or more species can be used among functional group-containing monomers such as carboxy group-containing monomers, hydroxy group-containing monomers, acid anhydride group-containing monomers, amide group-containing monomers, amino group-containing monomers, and monomers having nitrogen-containing rings. The secondary monomer may also be a vinyl ester-based monomer such as vinyl acetate, an aromatic vinyl compound such as styrene, a sulfonate group-containing monomer, a phosphate group-containing monomer, etc. For instance, from the standpoint of increasing the cohesive strength, an acrylic polymer in which a carboxy group-containing monomer or a hydroxy group-containing monomer is copolymerized as the secondary monomer is preferable. Preferable examples of the carboxy group-containing monomer include acrylic acid and methacrylic acid. Preferable examples of the hydroxy group-containing monomer include 2-hydroxyethyl acrylate and 4-hydroxybutyl acrylate.

The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less (e.g. 5% by weight or less). When a carboxy group-containing monomer is copolymerized in the acrylic polymer, from the standpoint of combining adhesive strength and cohesive strength, the carboxy group-containing monomer content is preferably about 0.1% by weight or greater (e.g. 0.2% by weight or greater, typically 0.5% by weight or greater); it is preferably about 10% by weight or less (e.g. 8% by weight or less, typically 5% by weight or less). When a hydroxy group-containing monomer is copolymerized in the acrylic polymer, from the standpoint of combining adhesive strength and cohesive strength, the hydroxy group-containing monomer content is preferably within a range of about 0.001% by weight or greater (e.g. 0.01% by weight or greater, typically 0.02% by weight or greater); it is preferably about 10% by weight or less (e.g. 5% by weight or less, typically 2% by weight or less). When a vinyl ester-based monomer such as vinyl acetate is copolymerized as the secondary monomer, the vinyl ester-based monomer content is preferably about 30% by weight or less (typically 10% by weight or less) of all the monomers used in the synthesis of the acrylic polymer; it can be, for instance, 0.01% by weight or greater (typically 0.1% by weight or greater).

The method for obtaining the acrylic polymer is not particularly limited. Various polymerization methods known as procedures for the synthesis of acrylic polymer can be suitably employed, such as solution polymerization, emulsion polymerization, bulk polymerization and suspension polymerization. It is also possible to employ active energy ray radiation polymerization which involves irradiation of UV etc. For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator.

From the standpoint of combining adhesive strength and cohesive strength in a well-balanced way, the acrylic polymer disclosed herein has a weight average molecular weight (Mw) of preferably $10 \times 10^4$ or higher, more preferably $20 \times 10^4$ or higher (e.g. $30 \times 10^4$ or higher); it is preferably $100 \times 10^4$ or lower, more preferably $70 \times 10^4$ or lower (e.g. $50 \times 10^4$ or lower). In this description, Mw refers to the value based on standard polystyrene obtained by GPC (gas permeation chromatography).

From the standpoint of increasing the cohesive strength, the PSA composition preferably comprises a crosslinking agent. The type of crosslinking agent is not particularly limited; one, two or more species can be suitably selected and used among heretofore known crosslinking agents. Preferable examples of the crosslinking agent include isocyanate-based crosslinking agents and epoxy-based crosslinking agents. The amount of the crosslinking agent used is not particularly limited. For instance, to 100 parts by weight of the acrylic polymer, it is suitably in a range of about 10 parts by weight or less (preferably about 5 parts by weight or less). It can be, for instance, about 0.005 part by weight or greater (preferably about 0.01 part by weight or greater).

The PSA layer disclosed herein may have a composition comprising a tackifier. The tackifier is not particularly limited. Various tackifier resins can be used, such as rosin-based tackifier resin, terpene-based tackifier resin, hydrocarbon-based tackifier resin, epoxy-based tackifier resin, polyamide-based tackifier resin, elastomer-based tackifier resin, phenolic tackifier resin, and ketone-based tackifier resin. These tackifier resins can be used solely as one species or in a combination of two or more species.

The tackifier resin preferably has a softening point (temperature of softening) of about 60° C. or higher (preferably about 80° C. or higher, typically 100° C. or higher). By this, the PSA sheet can be obtained with greater adhesive strength. The upper limit of the softening point of tackifier resin is not particularly limited; it can be about 180° C. or lower (e.g. about 140° C. or lower). The softening point of tackifier resin referred to herein is defined as the value measured by the softening point test method (ring and ball method) specified either in JIS K5902:2006 or in JIS K2207:2006.

The amount of tackifier can be suitably selected in accordance with the target adhesive properties (adhesive strength, etc.). For instance, by solid content, it is preferable to use a tackifier at a ratio of about 10 parts by weight or higher (more preferably 20 parts by weight or higher, or yet more preferably 30 parts by weight or higher) to 100 parts by weight of base polymer (preferably an acrylic polymer). The amount of tackifier used to 100 parts by weight of base polymer is, by solid content, preferably about 100 parts by weight or less (more preferably 80 parts by weight or less, or yet more preferably 60 parts by weight or less).

The PSA composition may comprise, as necessary, various additives generally known in the field of PSA compositions, such as leveling agent, crosslinking accelerator, plasticizer, softening agent, filler, anti-static agent, anti-aging agent, UV-absorbing agent, antioxidant and photo-stabilizing agent. With respect to these various additives, heretofore known species can be used by typical methods.

The PSA layer disclosed herein may be formed from aqueous, solvent-based, hot-melt, and active energy ray-curable types of PSA composition, etc. The aqueous PSA composition refers to a PSA composition in a form comprising PSA (PSA layer-forming components) in a solvent whose primary component is water (in an aqueous solvent), typically including a so-called water-dispersed PSA composition (a composition in a form where at least part of the PSA is dispersed in water). The solvent-based PSA composition refers to a PSA composition in a form comprising PSA in an organic solvent. From the standpoint of reducing environmental stress, an aqueous PSA composition is preferable. From the standpoint of the adhesive properties, etc., a solvent-based PSA composition is preferably used.

The PSA layer disclosed herein can be formed by a heretofore known method. For instance, a transfer method can be preferably used, in which a PSA composition is provided to a releasable surface (a release face) and allowed to dry to form a PSA layer on the surface and the PSA layer is transferred to a substrate. Alternatively, a direct method can also be employed, in which a PSA composition is directly provided (typically applied) to a substrate and allowed to dry to form a PSA layer. As the release face, a release liner surface, the back face of a substrate treated with a release agent, and the like can be used.

The PSA composition can be applied using a known or commonly used coater, such as a gravure roll coater, reverse roll coater, kiss roll coater, comma coater, dip roll coater, die coater, bar coater, knife coater, and spray coater. Alternatively, the PSA composition can be applied by immersion, curtain coating, etc.

From the standpoint of facilitating the crosslinking reaction, increasing the productivity, etc., the PSA composition is preferably heated to dry. The drying temperature can be, for instance, about 40° C. to 150° C., or usually preferably about 60° C. to 130° C. After dried, the PSA composition can be further allowed to age for adjustment of migration of the components in the PSA layer, for the progress of the crosslinking reaction, for releasing the distortion possibly present in the substrate and PSA layer, etc.

The thickness of the PSA layer disclosed herein is not particularly limited; it can be suitably selected in accordance with the purpose. Usually, from the standpoint of the productivity such as the drying efficiency, adhesive properties, etc., it is suitably about 0.5 µm or greater, preferably 2 µm or greater (e.g. 5 µm or greater, typically 10 µm or greater); it is preferably about 200 µm or less (e.g. 100 µm or less, typically 50 µm or less). In a preferable embodiment, the thickness of the PSA layer is 20 µm or smaller, more preferably 10 µm or smaller, or yet more preferably 7 µm or smaller (e.g. 5 µm or smaller). According to the art disclosed herein, even in an embodiment where the PSA layer is limited in thickness as above, good air release properties can be obtained. It is advantageous to limit the thickness of the PSA layer in view of making the PSA sheet thinner, smaller, lighter, resource-saving, and so on. When the art disclosed herein is implemented in an embodiment of an adhesively double-faced sheet having a PSA layer on each face of a substrate, the thicknesses of the respective PSA layers can be the same or different.

<Coating Layer>

The coating layer partially covering the PSA layer surface is not particularly limited as long as it can provide air release properties. A favorable example of the coating layer material is a resin material. From the standpoint of the appearance, the coating layer is preferably formed from a transparent or semi-transparent resin material.

Examples of the resin material form which the coating layer can be formed include a polyurethane-based resin, a phenolic resin, an epoxy-based resin, a polyamide-based resin, a urea melamine-based resin, a silicone-based resin, a polysilazane-based resin, a fluororesin, a phenoxy resin, a methacrylic resin, an acrylic resin, an acrylic urethane-based resin, an acrylic styrene-based resin, a polyarylate resin, a polyester-based resin, a polyolefinic resin, a polystyrene-based resin, polyvinyl chloride, a vinyl chloride/vinyl acetate copolymer, polyvinyl acetate, polyvinylidene chloride, polycarbonate, a cellulose, and a polyacetal. The resin can be one, two or more species of resin selected from various types of resins including a heat-curable resin, a UV-curable resin, an electron beam-curable resin, and a two-component resin that is curable upon mixing.

The coating layer disclosed herein may comprise as necessary various additives such as fillers, anti-aging agent, antioxidant, UV absorber, crosslinking agent, slip agent, colorant (pigment, dye, etc.), antistatic agent, viscosity-adjusting agent (thixotropic agent, thickening agent, etc.), and film-forming aid.

The coating layer is typically non-adhesive or weakly adhesive. This preferably brings about good air release properties. Here, that the coating layer is non-adhesive or weakly adhesive means that the coating layer has a 180° peel strength less than 3 N/25 mm (typically less than 1 N/25 mm, including unmeasurably low adhesive strength). In particular, the 180° peel strength of the coating layer is determined by the following method: The PSA sheet having a coating layer over the entire PSA layer surface is cut to a 25 mm wide by 100 mm long size to obtain a measurement sample; in an environment at 23° C., 50% RH, the measurement sample is press-bonded over its coating layer surface to the surface of a stainless steel plate (SUS304BA plate) with a 2 kg roller moved back and forth once. If it does not adhere, it is considered non-adhesive here. The resultant is left standing in the same environment for 30 minutes. Using a universal tensile/compression tester, based on JIS Z 0237:2000, it is then measured for peel strength (N/25 mm) at a tensile speed of 300 mm/min at a peel angle of 180°.

In a typical embodiment, the coating layer surface may have an arithmetic average roughness of 0.1 µm or greater. In such an embodiment, when the adhesive face of the PSA sheet is adhered to an adherend, the air passage at the coating layer surface will improve to bring about greater air release properties. The arithmetic average roughness is preferably 0.2 µm or greater, for instance, greater than 1 µm. The maximum arithmetic average roughness is not particularly limited. For instance, it is suitably about 5 µm or less.

The method for placing the coating layer on the PSA layer surface is not particularly limited. In typical, a method as described next is employed. In particular, a coating layer-forming composition is prepared as necessary by dissolution or dispersion in a suitable solvent. Subsequently, by employing a suitable method among various known or commonly-used printing methods, the composition is provided to a release face of a releasable support (or a coating layer-transferring film, typically a release liner) and allowed to cure. The releasable support surface on which the coating layer is formed is brought into contact with the PSA layer surface to transfer the coating layer onto the PSA layer surface. The coating layer is thus partially placed on the PSA layer surface. For instance, a desirable coating layer pattern such as a lattice pattern can be preferably formed by employing a method such as offset printing, silk screen printing, letterpress printing, flexographic printing, gravure printing, and inkjet printing. From the standpoint of the air release properties, gravure printing is more preferable. Alternatively, the same embodiment can also be obtained by forming a coating layer on a release face as described above and further forming a PSA layer to cover the coating layer. In case of a substrate-supported PSA sheet, the resulting PSA layer is subsequently transferred onto a surface of a substrate film. Based on technical common knowledge in the pertinent field, a skilled person can employ a method as described above, select a coating layer material in view of the wetting properties relative to the release face of the releasable support, adjust the viscosity of the coating layer-forming composition to a suitable range, and further select, for instance, a suitable printing means to form a coating layer disclosed herein.

The thickness of the coating layer can be designed to obtain desirable air release properties and is not particularly limited. From the standpoint of the smoothness of the PSA sheet's adhesive face and the lamination on the PSA layer, it is preferable that the thickness of the coating layer is about equal to or less than the thickness of the PSA layer. In a preferable embodiment, the ratio ($T_C/T_A$) of the thickness $T_C$ of the coating layer to the thickness $T_A$ of the PSA layer is 0.75 or less, more preferably 0.70 or less, or yet more preferably 0.5 or less (e.g. 0.4 or less). For instance, a higher degree of smoothness is obtained in an embodiment where the PSA layer has a thickness of 1 µm or greater (preferably 2 µm or greater, or more preferably 3 µm or greater) while satisfying the ratio ($T_C/T_A$). In another embodiment, from the standpoint of combining air release properties and appearance, the thickness of the coating layer is preferably up to about a half (e.g. up to one-third, typically up to one-fifth) the thickness of the PSA layer. From the standpoint of preventing the air release effect from degrading due to excessive embedding of the coating layer into the PSA layer, $T_C/T_A$ can be, for instance, 0.05 or higher, or even 0.10 or higher. In some embodiments, $T_C/T_A$ can be, for instance, 0.15 or higher, 0.20 or higher, or even 0.30 or higher.

From the standpoint of the air release properties, productivity, etc., the particular thickness of the coating layer is preferably 0.1 µm or greater (e.g. 0.5 µm or greater, typically 1 µm or greater). From the standpoint of the smoothness, the lamination and the appearance of the adhesive face of the PSA sheet, the coating layer has a thickness of preferably 10 µm or less, more preferably 5 µm or less, yet more preferably 4 µm or less (e.g. less than 4 µm, typically 3 µm or less), or particularly preferably less than 3 µm (e.g. 2 µm or less, typically less than 2 µm). According to the art disclosed herein, even when the coating layer is such a thin layer, good air release properties are obtained. The PSA sheet having such a thin coating layer is particularly preferable for use in applications that require thinning (typically mobile electronic applications). The thickness of the coating layer can be obtained by SEM (scanning electron microscopy) or TEM (transmission electron microscopy) analysis of a cross section of the PSA sheet.

<Substrate Film>

When the PSA sheet disclosed herein includes a substrate film, as the substrate film, it is possible to use, for instance, resin film, paper, cloth, rubber film, foam film, and metal foil as well as a composite and a laminate of these. In particular, from the standpoint of the ease of application and the appearance, it preferably comprises a resin film layer. The inclusion of the resin film layer is advantageous also from the standpoint of the size stability, the accuracy of thickness, the ease of processing, the tensile strength and so on. Examples of the resin film include polyolefinic resin film such as PE, PP, and ethylene/polypropylene copolymers; polyester-based resin film such as PET, polybutylene terephthalate, and polyethylene naphthalate; vinyl chloride-based resin film; vinyl acetate-based resin film; polyimide-based resin film; polyamide-based resin film; fluororesin film; and cellophane. Favorable examples include resin films formed from PE, PP and PET. Among the resin films, polyester film is more preferable; among them, PET film is even more preferable. The substrate film may have a monolayer structure or a multilayer structure formed of two, three or more layers.

In a preferable embodiment, the substrate film is a substrate comprising a foam film (a foam-containing substrate). This provides impact-absorbing capabilities to the PSA sheet. Here, the foam film refers to a film structure having a part with pores (a pore structure). The foam-containing substrate may be a mono-layer structure formed from a foam film or a multi-layer structure wherein at least one of whose two or more layers is formed of a foam film (a foam layer). A configurational example of the foam-containing substrate is a composite substrate in which a foam film (a foam layer) and a non-foamed film (a non-foamed layer) are laminated. The non-foamed film (non-foamed layer) refers to a film structure that has not been subjected to a purposeful foaming process (e.g. a process to incorporate pores), referring to a film essentially free of a pore structure. A typical example of the foam film is a resin film (e.g. a polyester-based resin film such as of PET) having an expansion rate of less than 1.1-fold (e.g. less than 1.05-fold, typically less than 1.01-fold). When the substrate film comprises two or more foam layers, the materials and structures of these foam layers can be identical or different. When the foam film has a multilayer structure that includes a foam layer, from the standpoint of increasing the tightness between layers, adhesive layers may be placed between the layers.

The foam film is not particularly limited in average pore diameter; it is usually suitably 10 μm or greater, preferably 20 μm or greater, or more preferably 30 μm or greater. When the average pore diameter is 10 μm or greater, the impact absorbing properties tend to increase. The average pore diameter is usually suitably 200 μm or less, preferably 180 μm or less, or more preferably 150 μm or less. When the average pore diameter is 200 μm or smaller, the handling properties and waterproof properties (water-blocking properties) tend to increase. The average pore diameter (μm) of the foam film can be determined, using a low-vacuum scanning electron microscope to take an enlarged image of a cross section of the foam and subjecting it to image analysis. About 20 to 30 pores can be analyzed. As the low-vacuum scanning electron microscope, for instance, product name S-3400N Scanning Electron Microscope available from Hitachi High-Tech Science Systems Corporation) can be used.

The foam film is not particularly limited in density (apparent density); it is usually suitably 0.01 g/cm$^3$ or higher, preferably 0.01 g/cm$^3$ or higher, or more preferably 0.02 g/cm$^3$ or higher. When the density is 0.01 g/cm$^3$ or higher, the strength of the foam film (and even that of the PSA sheet) will increase with a tendency toward greater impact resistance and handling properties. The density is preferably 0.7 g/cm$^3$ or lower, or more preferably 0.5 g/cm$^3$ or lower. When the density is 0.7 g/cm$^3$ or lower, the conformability to a difference in level tends to increase without an excessive decrease in flexibility. The density (apparent density) of the foam film is determined based on the method described in JIS K 7222:1999. In particular, the foam film is punched out into a 100 mm by 100 mm size to prepare a specimen and the dimensions of the specimen are measured. Using a ¹⁄₁₀₀ dial gauge with a 20 mm diameter measurement terminal, the thickness of the specimen is measured. From these values, the volume of the foam film specimen is determined. The specimen is weighed on a top-loading balance (minimum scale 0.01 g or greater). From these values, the apparent density (g/cm$^3$) of the foam film can be determined.

The 50% compressive stress of the foam film is not particularly limited. From the standpoint of the impact resistance, the foam film suitably shows a 50% compressive stress of 0.1 N/cm$^2$ or greater. When the 50% compressive stress is at or above a certain value, for instance, even if the foam film is thin (e.g. about 100 μm thick), it can show sufficient resistance when compressed (resilience to compression) and maintain good impact resistance. The 50% compressive stress is preferably 0.2 N/cm$^2$ or greater, or more preferably 0.5 N/cm$^2$ or greater. From the standpoint of combining flexibility and impact resistance in a well-balanced way, the 50% compressive stress is suitably 8 N/cm$^2$ or less, preferably 6 N/cm$^2$ or less, or more preferably 3 N/cm$^2$ or less. The 50% compressive stress (hardness) of the foam film is determined based on JIS K 6767:1999. In particular, the foam film is cut to 100 mm by 100 mm pieces. These pieces are layered to a total thickness of at least 2 mm and the resultant is used as a measurement sample. At room temperature, using a compression tester, the measurement sample is compressed at a rate of 10 mm/min. When compressed to 50% (when compressed to 50% of its initial thickness) and held at 50% compression for 10 seconds, the value (resilience in N/cm$^2$) is recorded as the 50% compressive stress. Other conditions (e.g. jig and calculation method, etc.) are conformed to JIS K 6767:1999.

The foam constituting the foam film disclosed herein is not particularly limited in pore structure. The pore structure can be a continuous pore structure, an isolated pore structure, or a semi-continuous pore structure. From the standpoint of the impact absorbing properties, continuous and semi-continuous pore structures are preferable.

The material of the foam film is not particularly limited. The foam film can be typically formed from a material comprising a polymer component (e.g. a thermoplastic polymer). A preferable foam film is usually formed of foam of a plastic material (plastic foam). The plastic material (which means to include a rubber material) for forming the plastic foam is not particularly limited; a suitable species can be selected among known plastic materials. For the plastic material (typically a thermoplastic polymer), solely one species or a combination of two or more species can be used. The primary component (typically a component accounting for more than 50% by weight) among the polymers in the substrate film or the foam film may be referred to as the "base polymer" hereinafter.

Specific examples of the foam include polyolefinic resin foam such as PE foam and PP foam; polyester-based foam such as PET foam, polyethylene naphthalate foam and polybutylene terephthalate foam; polyvinyl chloride-based resin foam such as polyvinyl chloride foam; vinyl acetate-based foam; acrylic resin foam; polyphenylene sulfide resin foam; amide-based resin foam such as polyamide (nylon) resin foam and all-aromatic polyamide (aramide) resin foam; polyimide-based resin foam; polyether ether ketone (PEEK) foam; styrene-based resin foam such as polystyrene foam; and urethane-based resin foam such as polyurethane resin foam. As the foam, rubber-based resin foam such as polychloroprene rubber foam can be used as well.

In a preferable embodiment, acrylic resin foam (foam formed from acrylic resin) is used as the foam. Here, the acrylic resin foam refers to foam comprising an acrylic polymer as the base polymer. The acrylic polymer in this description is as defined earlier. As the alkyl (meth)acrylate forming the acrylic polymer, one, two or more species can be preferably used among alkyl (meth)acrylates having acyclic alkyl groups with 1 to 20 (preferably 1 to 8, typically 1 to 4) carbon atoms. Preferable examples of the alkyl (meth)acrylate include ethyl acrylate, n-butyl acrylate and 2-ethylhexyl acrylate. The amount of the alkyl (meth)acrylate as the primary monomer is suitably 70% by weight or more of all monomers in the acrylic polymer, or preferably 75% by weight or more (e.g. 80% by weight or more). The amount of the alkyl (meth)acrylate is suitably 98% by weight or less of all the monomers, or preferably 97% by weight or less (e.g. 96% by weight or less).

The secondary monomer co-polymerizable with the alkyl (meth)acrylate as the primary monomer may be useful in introducing crosslinking points in the acrylic polymer or in increasing the cohesive strength of the acrylic polymer. As the secondary monomer, one, two or more species of functional group-containing monomers can be used among, for instance, carboxy group-containing monomers, hydroxy group-containing monomers, acid anhydride group-containing monomers, amide group-containing monomers, amino group-containing monomers, cyano group-containing monomers, monomers having nitrogen atom-containing rings and the like. The secondary monomer can also be a vinyl ester-based monomer such as vinyl acetate, an aromatic vinyl compound such as styrene, a sulfonate group-containing monomer, a phosphate group-containing monomer and the like. The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less.

When the foam is formed with an emulsion-based resin composition by a foaming method where gases including air are mixed in mechanically such as by stirring, it is preferable that the monomers forming the acrylic polymer comprise a nitrogen atom-containing monomer as the secondary monomer. This facilitates the formation of pores in the foaming process and may increase the viscosity of the composition when forming the foam (typically when drying the resin composition), whereby the pores are readily kept in the foam body.

Examples of the nitrogen atom-containing monomer include cyano group-containing monomers such as acrylonitrile and methacrylonitrile; lactam ring-containing monomers such as N-vinyl-2-pyrolidone; amide group-containing monomers such as (meth)acrylamide, N-hydroxyethyl (meth)acrylamide, N-methylolacrylamide, N,N-dimethylacrylamide, N,N-diethylacrylamide and diacetone acrylamide. These can be used solely as one species or in a combination of two or more species. Among them, cyano group-containing monomers such as acrylonitrile and lactam ring-containing monomers such as N-vinyl-2-pyrolidone are preferable.

The amount of the nitrogen atom-containing monomer is suitably 2% by weight or more of all monomers in the acrylic polymer, or preferably 3% by weight or more (e.g. 4% by weight or more). The amount of the nitrogen atom-containing monomer is suitably 30% by weight or less of all the monomers, or preferably 25% by weight or less (e.g. 20% by weight or less).

The method for obtaining the acrylic polymer is not particularly limited. Various polymerization methods known as procedures for the synthesis of acrylic polymer can be suitably used, such as solution polymerization, emulsion polymerization, bulk polymerization, suspension polymerization, active energy ray polymerization (e.g. UV polymerization). For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator. In view of the ease of foaming and environmental aspects, it is preferable to use acrylic resin foam (emulsion-based acrylic resin foam) obtained by emulsion polymerization.

From the standpoint of increasing the cohesive strength, the acrylic resin foam-forming composition preferably comprises a crosslinking agent. The type of crosslinking agent is not particularly limited. Among various crosslinking agents, one, two or more species can be suitably selected and used. Favorable examples of the crosslinking agent include isocyanate-based crosslinking agents, epoxy-based crosslinking agents, oxazoline-based crosslinking agents, carbodiimide-based crosslinking agents, melamine-based crosslinking agents and metal oxide-based crosslinking agents. In particular, oxazoline-based crosslinking agents are preferable. The amount of the crosslinking agent used is not particularly limited. To 100 parts by weight of the acrylic polymer, it is suitably about 10 parts by weight or less (preferably about 5 parts by weight or less); it can be 0.005 par by weight or greater (preferably about 0.01 part by weight or greater).

In another preferable embodiment, polyolefinic resin foam (resin foam formed from a polyolefin) is used as the foam. As the plastic material forming the polyolefinic foam, various known or commonly-used polyolefinic resins can be used without particular limitations. Examples include polyethylene such as low density polyethylene (LDPE), linear low density polyethylene (LLDPE), high density polyethylene (HDPE) and metallocene catalyst-based linear low density polyethylene; polypropylene; ethylene-propylene copolymer; and ethylene-vinyl acetate copolymer. Among these polyolefinic resins, solely one species or a combination of two or more species can be used.

From the standpoint of the impact resistance, waterproof properties, etc., favorable examples of the foam film in the art disclosed herein include a polyethylene-based foam film essentially formed of polyethylene-based resin foam and a polypropylene-based foam film essentially formed of polypropylene-based resin foam. Here, the polyethylene-based resin refers to resin formed from ethylene as the primary monomer (i.e. the primary component among the monomers) and may include HDPE, LDPE and LLDPE as well as ethylene-propylene and ethylene-vinyl acetate copolymers of which ethylene is copolymerized at a ratio above 50% by weight. Similarly, the polypropylene-based resin refers to resin formed from propylene as the primary monomer. As the foam film in the art disclosed herein, a polypropylene-based foam film can be preferably used.

The foaming method for the foam film is not particularly limited. In accordance with the purpose, ease of procedures, etc., chemical procedures, physical procedures and so on can be employed individually or in combination. From the standpoint of the contamination, etc., physical foaming methods are preferable. Specific examples include a foaming method where a film-forming material is prepared to contain a foaming agent such as a low boiling compound (e.g. a hydrocarbon) and thermally expandable microspheres and pores are formed from the foaming agent, a foaming method where gases such as air are mechanically mixed in, a foaming method by solvent removal which takes advantage of removal of a solvent such as water, and a foaming method using a supercritical fluid. For instance, a method where an inert gas (e.g. carbon dioxide) is injected into the foam film-forming polymer under increased pressure and the resultant is placed under reduced pressure to form a foam film By this method, the average pore diameter can be easily controlled to be at or below a certain value and the foam film can be easily made to have a lower density.

The foam film is fabricated by employing a foaming method as described above. The formation of the foam film is not particularly limited. For instance, when employing a foaming method that mechanically admixes gases such as air, a resin composition (e.g. an emulsion-based resin composition) containing foam can be subsequently applied over a substrate or release paper, etc., and allowed to dry to obtain a foam film. From the standpoint of the foam stability, etc., the drying preferably includes a preliminary drying step at or above 50° C., but below 125° C. as well as a main drying step at 125° C. to 200° C. Alternatively, foam can be formed continuously into a film using a calender, extruder, conveyer belt casting and so forth; or a method where a kneaded mixture of foam-forming materials is foamed and molded in a batch process can be employed. In forming the foam film, a surface layer may be removed by slicing to adjust the film to obtain desirable thickness and foam characteristics.

The thermoplastic polymer (e.g. a polyolefinic polymer) that can be included in the foam film may comprise a thermoplastic elastomer that exhibits properties of rubber at room temperature, but shows thermoplasticity at a high temperature. From the standpoint of the flexibility and conformability, one, two or more species can be used among thermoplastic elastomers, for instance, olefinic elastomers such as ethylene-propylene copolymer, ethylene-propylene-diene copolymer, ethylene-vinyl acetate copolymer, polybutene, polyisobutylene, and chlorinated polyethylene; styrene-based elastomers such as styrene-butadiene-styrene copolymer; thermoplastic polyester-based elastomers; thermoplastic polyurethane-based elastomers; and thermoplastic acrylic elastomers. Among them, a thermoplastic elastomer having a glass transition temperature of room temperature or lower (e.g. 20° C. or lower). The thermoplastic elastomer content in the foam film is preferably about 10% by weight or more (e.g. 20% by weight or more) of the thermoplastic polymer in the foam film; it is preferably about 90% by weight or less (e.g. 80% by weight or less).

From the standpoint of the ease of mixing a foam-forming gas and the foam stability, as the foaming agent, various surfactants can be used in the foam film-forming material (e.g. an emulsion-based acrylic resin composition), with examples including anionic surfactants, cationic surfactants, nonionic surfactants and amphoteric surfactants. Hydrocarbon-based and fluorine-based surfactants can be used as well. In particular, from the standpoint of reducing the pore diameters and stabilizing the foam, anionic surfactants are preferable; ammonium salts of fatty acids (typically ammonium salts of higher fatty acids) such as ammonium stearate are more preferable. For the surfactant, solely one species or a combination of two or more species can be used. The surfactant content is preferably about 0.1 part by weight or greater (e.g. 0.5 part by weight or greater); it is preferably 10 parts by weight or less (e.g. 8 parts by weight or less) to 100 parts by weight of the base polymer of the foam film. The foaming agent in this description includes not only an agent that shows foaming capabilities, but also a pore diameter-adjusting agent to reduce the foam diameters as well as a foam stabilizer such as a foam-adjusting agent.

When the foam film-forming material is an aqueous dispersion (e.g. an acrylic emulsion), it is preferable to use a silicone-based compound as the foaming agent. By this, the recovery of thickness (the degree and speed of recovery) after compression tends to improve. A preferable silicone-based compound has 2000 or fewer siloxane bonds. Examples of the silicone-based compound include silicone oil, modified silicone oil, and silicone resin. In particular, dimethyl silicone oil and methyl phenyl silicone oil are preferable. As the silicone-based compound, a silicone-modified polymer (e.g. a silicone-modified acrylic polymer, a silicone-modified urethane-based polymer, etc.) can be used as well. These can be used solely as one species or in a combination of two or more species. The silicone compound content is preferably about 0.01 part by weight or greater (e.g. 0.05 part by weight or greater, typically 0.1 part by weight or greater) to 100 parts by weight of the base polymer of the foam film; it is preferably about 5 parts by weight or less (e.g. 4 parts by weight or less, typically 3 parts by weight or less).

From the standpoint of stabilizing the foam and increasing the ease of film formation, the foam film-forming material (e.g. an emulsion-based acrylic resin composition) may comprise a thickener. The thickener is not particularly limited. Examples include acrylic acid-based thickeners, urethane-based thickeners and polyvinyl alcohol-based thickeners. In particular, polyacrylic acid-based thickeners and urethane-based thickeners are preferable. The thickener content is preferably about 0.1 part to 10 parts by weight (e.g. 0.1 part to 5 parts by weight) to 100 parts by weight of the base polymer of the foam film.

When a foam-containing substrate is used as the substrate film, the foam film preferably comprises a foam-nucleating agent such as a metal hydroxide (e.g. magnesium hydroxide). This tends to facilitate the adjustment of the average pore diameter in the foam film to obtain desirable impact-absorbing properties, flexibility and so on. The foam-nucleating agent can be a metal oxide, composite oxide, metal carbonate, metal sulfate, etc. The foam-nucleating agent content is preferably about 0.5 part by weight or greater (e.g. 1 part by weight or greater) to 100 parts by weight of the base polymer of the foam film; it is preferably about 125 parts by weight or less (e.g. 120 parts by weight or less).

When using a foam-containing substrate as the substrate film, from the standpoint of inhibiting the foam from degassing while pores are being formed, the foam film preferably comprises a degassing inhibitor such as fatty acid amides. Amore preferable fatty acid amide has a bis-amide structure. The degassing inhibitor can be a metal salt of a fatty acid as well. The degassing inhibitor content is preferably about 0.5 part by weight or greater (e.g. 0.7 part by weight or greater, typically 1 part by weight or greater) to 100 parts by weight of the base polymer of the foam film; it is preferably about 10 parts by weight or less (e.g. 8 parts by weight or less, typically 6 parts by weight or less).

The substrate film (e.g. a foam film) may comprise a softener so as to provide desirable fluidity to the film-forming material thereby to improve properties such as flexibility. With the inclusion of a softener in the foam film, properties such as ease of stretching the film and expansion ratio can be preferably adjusted. For example, one, two or more species can be preferably used among hydrocarbon-based softeners such as liquid paraffin, paraffin wax, micro wax and polyethylene wax; ester-based softeners such as glyceryl stearate; and fatty acid-based softeners. The softener content is preferably 0.5 part by weight or greater (e.g. 0.8 part by weight or greater, typically 1 part by weight or greater) to 100 parts by weight of the base polymer of the substrate film (e.g. a foam film); it is preferably 50 parts by weight or less (e.g. 40 parts by weight or less, typically 30 parts by weight or less).

When emulsion-based acrylic resin foam is used, an arbitrary anticorrosive may be included to prevent corrosion of metal parts adjacent to the foam film. As the anticorrosive, an azole ring-containing compound is preferable. With the use of an azole ring-containing compound, inhibition of metal corrosion and tight adhesion to adherends can be combined at a high level. In particular, a compound with the azole ring forming a fused ring with an aromatic ring such as a benzene ring is preferable; benzotriazole-based compounds and benzothiazole-based compounds are especially preferable. The anticorrosive content is preferably about 0.2 part by weight or greater (e.g. 0.3 part by weight or greater) to 100 parts by weight of the base polymer of the foam film; it is preferably about 5 parts by weight or less (e.g. 2 parts by weight or less).

In a preferable embodiment, the substrate film is transparent (including semi-transparency). In the PSA sheet comprising such a substrate film, when bubbles and the like are trapped between the PSA sheet and an adherend, they are visible through the PSA sheet and are likely to degrade the appearance. The art disclosed herein prevents formation of the sort of bubbles between the PSA sheet and the adherend; and therefore, an excellent appearance can be obtained in an embodiment comprising a transparent substrate. In particular, the substrate film may show a total light transmittance of 80% or higher (e.g. 90% or higher, typically 95% or higher). The substrate film preferably has a haze value of 10% or lower (e.g. 5% or lower).

To obtain desirable designs and optical properties, the substrate film (e.g. a resin film) may be colored black, white or other with various types of colorant (e.g. pigment) content. As a black colorant, carbon black is preferable. It is also possible to employ a method where at least one surface (one or each face) of the substrate film is subjected to printing to overlay one, two or more colored layers (e.g. a black layer and a white layer).

To the substrate film (e.g. a resin substrate film, a foam substrate film), various additives may be added as necessary, such as filler (inorganic filler, organic filler, etc.), anti-aging agent, antioxidant, UV ray absorber, antistatic agent, slip agent and plasticizer.

When the PSA sheet is adhesive on one face, between the two surfaces of the substrate film, the surface (back face) opposite from the surface to be provided with a PSA layer is preferably made smooth. The smooth surface may be the outer face of the PSA sheet; and therefore, when the PSA sheet having the smooth surface is used as, for instance, a decorative sheet or a surface protection sheet, it may provide a better appearance (design). In a preferable embodiment, from the standpoint of the adhesive properties and the quality of appearance (design), the arithmetic average roughness of back face of the substrate film can be 1 µm or less (e.g. about 0.75 µm or less, typically about 0.5 µm or less); it can be about 0.05 µm or greater (typically about 0.1 µm or greater).

When an adhesively single-faced PSA sheet is wound to bring the back face of the substrate film in contact with the PSA layer surface, the back face (opposite from the surface to be provided with a PSA layer) of the substrate film may be subjected as necessary to release treatment with a silicone-based, long chain alkyl-based, fluorine-based release agent or the like. The release treatment brings about effects such as easier unwinding of the PSA sheet wound in a roll. On the other hand, the PSA layer-side surface of the substrate film may be subjected to a heretofore known surface treatment such as corona discharge treatment and primer coating for purposes such as increasing the tightness of adhesion between the substrate and the PSA layer.

The thickness of the substrate film is not particularly limited and can be suitably selected in accordance with the purpose. In general, the substrate's thickness is usually suitably 1 µm or larger (e.g. about 2 µm or larger), or preferably about 5 µm or larger (e.g. 10 µm or larger, typically 15 µm or larger); the thickness is suitably, for instance, about 500 µm or smaller, or preferably about 200 µm or smaller (typically 100 µm or smaller). In a preferable embodiment, the thickness of the substrate film is about 30 µm or smaller, more preferably 12 µm or smaller, or yet more preferably smaller than 10 µm (e.g. smaller than 5 µm, typically smaller than 3 µm). It is advantageous to limit the thickness of the substrate film in view of making the PSA sheet thinner, smaller, lighter, resources-saving, and so on.

When the substrate film comprises a foam film, the thickness of the foam-containing substrate (e.g. a foam substrate film) can be suitably selected in accordance with the strength and flexibility of the PSA sheet, intended purposes and so on. From the standpoint of the impact-absorbing properties, etc., the foam-containing substrate has a thickness of suitably 30 µm or larger, preferably 50 µm or larger, or more preferably 60 µm or larger (e.g. 80 µm or larger). From the standpoint of making the PSA sheet thinner, smaller, lighter, resource-saving, and so on, the thickness of the foam-containing substrate is usually suitably 1 mm or smaller. The use of the foam film disclosed herein can bring about excellent impact-absorbing capabilities even when the thickness is about 350 µm or smaller (more preferably 250 µm or smaller, e.g. 180 µm or smaller). The thickness of the foam film (possibly a foam layer) in the foam-containing substrate can also be preferably selected from the ranges exemplified as the thickness of the aforementioned foam-containing substrate.

As described above, in applying the PSA sheet disclosed herein to an adherend, the sort of bubble formation can be efficiently prevented at the interface with the adherend. Thus, in either application method between application by hand (manual application) and application with an automated applicator or the like (automated application), the ease of application will improve. For example, when applied by manual application, the degree of dependence on skills of individuals can be reduced, thereby bringing about advantages such as increases in efficiency and quality of the application and their stabilization. When applied by automated application, failures during application such as trapping of bubbles and reapplication work can be reduced. Accordingly, either by manual application or by automated application, it is possible to bring about increases in application efficiency and quality, stabilization of the quality and so on, thereby increasing the productivity and quality of products made with the use of the PSA sheet as well. The art disclosed herein can bring about more uniform application; and therefore, it is particularly favorable as a PSA sheet that is applied with an automated applicator.

Between the PSA sheet and the adherend, the sort of bubble formation may occur, not just during the application, but also after the application as the time passes. In typical, after the PSA sheet is applied, upon storage and use in an environment at a relatively high temperature (e.g. 35° C. or higher), etc., aforementioned bubbles and the like may form between the PSA sheet and the adherend, causing degradation of the appearance. For instance, such high temperature conditions are likely to be reached in factories and outdoor in summer, inside electronics, etc. According to the art disclosed herein, even when used for applications exposed to such high temperature environments, the sort of bubble formation can be prevented.

With the benefit of the features described above, the PSA sheet disclosed herein can be preferably used for application to surfaces of various articles. In a preferable embodiment, it can be used as decorative sheets and surface protection sheets of various kinds, a fixing sheet for printing plates of flexographic printing and the like, a light-blocking sheet, and so on. For instance, it is preferable as a decorative sheet (typically a paint-substitute sheet) applied to vehicle exteriors, house building materials, and so on. It is also preferable for use inside electronics such as displays (typically TV displays) as a cover sheet used to increase the smoothness of the outer face of a chassis or to cover uneven places such as of screw holes in surfaces of various parts. The use of such a cover sheet can decrease unevenness of the appearance of the adherend's outer surface and make the dimensional precision uniform. It can also be preferably used as an exterior sheet for battery packs for which the appearance is important.

Even when made thin, with the PSA sheet disclosed herein, it is possible to prevent degradation of appearance quality after its application while maintaining good adhesive properties. Thus, it can be preferably used for applications (e.g. for mobile electronics) where a thinner build and a lighter weight are required desirably with saving of resources. In particular, it can be preferably used as a surface protection sheet for mobile electronics such as mobile phones, smartphones, tablet PCs, notebook PCs, various wearable devices (e.g. wrist wearables put on wrists such as wrist watches; modular devices attached to bodies with clips, straps, etc.; eye wears including eye glass types (monocular or binocular, including head-mounted pieces); clothing types worn as, for instance, accessories on shirts, socks, hats/caps, etc.; ear-mounted pieces put on ears such as earphones), digital cameras, digital video cameras, acoustic equipment (portable music players, IC recorders, etc.), computing devices (calculators, etc.), portable game devices, electronic dictionaries, electronic notebooks, electronic books, automotive information systems, portable radios, portable televisions, portable printers, portable scanners, and portable modems; for bonding/fixing applications in liquid crystal displays of these mobile electronics; for fixing protection panels (lenses) to protect the displays of these mobile electronics; for fixing key modules of mobile phones; for fixing rim sheets, decorative panels, batteries, and various other parts; fixing labels (including various marks) such as logos (letter logos) and various designs (symbols); and for like purposes. When used for the mobile electronics, the PSA sheet may have a shape in accordance with the purpose and so on, such as a frame shape and a ribbon shape (a strip shape). In this description, to be "mobile," it is not sufficient that it can be just carried, but it needs to be mobile enough for an individual (an average adult) to be able to carry it by hand relatively easily.

Several Examples related to the present invention are described below, but the present invention is not intended to be limited to these Examples. In the description below, "parts" and "%" are by weight unless otherwise noted.

Example 1

(Preparation of PSA Composition)

In a reaction vessel equipped with a stirrer, thermometer, nitrogen inlet, reflux condenser and addition funnel, were placed 70 parts of n-butyl acrylate, 30 parts of 2-ethylhexyl acrylate, 3 parts of acrylic acid, 0.05 part of 4-hydroxybutyl acrylate, 0.08 part of azobisisobutyronitrile as polymerization initiator and toluene as the polymerization solvent. Solution polymerization was carried out at 60° C. for 6 hours to obtain an acrylic polymer solution in toluene (viscosity 28 Pa·s, 40% non-volatiles). The resulting acrylic polymer had a Mw of about $44 \times 10^4$.

To 100 parts of the acrylic polymer in the toluene solution, was admixed 30 parts of a polymerized rosin pentaerythritol ester (trade name PENSEL D125 available from Arakawa Chemical Industries, Ltd.; softening point 125° C.) followed by 3 parts of an isocyanate-based crosslinking agent (trade name CORONATE L available from Tosoh Corporation) to prepare an acrylic PSA composition.

(Fabrication of Release-Lined PSA Sheet)

75 μm thick polyester release film (product name LUMIRROR S10 available from Toray Industries, Inc.) with a release face having the arithmetic average roughness (Ra) value shown in Table 1 was subjected to release treatment to fabricate a release film. As for the release treatment, in the method employed, one face was subjected to C1 treatment and the other face was subjected to CA1 treatment (both by Fujico Co., Ltd.). The release face (CA1-treated face) of this release film was provided with a coating layer-forming material (urethane-based, two-component ink (curable when mixed)) by gravure printing to form a coating layer (coating thickness about 1.5 μm, transparent) in a lattice pattern. A coating layer-bearing release film was thus obtained, with the coating layer formed partially on the release face.

To the coating layer-bearing face of the coating layer-bearing release film, the PSA composition was applied with a comma coater and allowed to dry to a final thickness of 4 μm to obtain a PSA layer supported on the release film. A 2 μm thick PET substrate film (trade name LUMIRROR SDC61 available from Toray Industries, Inc.) was obtained. Onto the first face (corona discharge-treated face) of the PET substrate, the resulting PSA layer was transferred along with the release film supporting it. The release film was used as it was to protect the PSA layer surface.

To the release agent-treated face of 38 μm thick release film (trade name DIAFOIL MRF-38 available from Mitsubishi Plastics, Inc.), the PSA composition was applied and allowed to dry to a final thickness of 4 μm to obtain a PSA layer supported on the release film. The resulting PSA layer was transferred along with the release film supporting it onto the second face (corona discharge-treated face) of the PET substrate. The release film was used as it was to protect the PSA layer surface.

By transferring the respective PSA layers onto the two faces of the PET substrate by the methods described above, a release-linered double-faced PSA sheet was fabricated, with one face of the PET substrate provided with the coating layer-bearing PSA layer and the second face thereof provided with the coating layer-free PSA layer. One of the adhesive faces of the PSA sheet was a coating layer-bearing adhesive face where the coating layer in the lattice pattern shown in FIG. 1 was formed, with each coating layer band having a width (line width) of about 0.2 mm and the coating layer bands having intervals of about 1.8 mm and a pitch of about 2 mm. The % surface area of the coating layer in the adhesive face of the PSA sheet was 19%. The other adhesive face of the PSA sheet was a coating layer-free adhesive face.

Example 2

Using the same kind of polyester release liner substrate and the same release agent as those used in Example 1, the surface of the release liner substrate was roughened and a release layer was formed over it to obtain a 75 μm thick release film having a release face with the arithmetic average roughness (Ra) value shown in Table 1. Otherwise in the same manner as Example 1, was obtained a release-linered double-faced PSA sheet according to this Example. Accordingly, the release film of this Example also had one C1-treated face as well as one CA1-treated face on which a coating layer was partially formed.

Example 3

The roughening method was changed. Otherwise in the same manner as Example 2, was obtained a 75 μm thick release film having a release face with the arithmetic average roughness (Ra) value shown in Table 1. Otherwise in the same manner as Example 1, was obtained a release-linered double-faced PSA sheet according to this Example.

[Air Release Properties]

From the resulting release-linered double-faced PSA sheet according to each Example, one release liner was removed to expose the corresponding adhesive face (coating layer-bearing adhesive face). On top of a horizontally placed stainless steel plate (SUS plate) as the adherend, the PSA sheet was loaded (but not press-bonded) with the coating layer-bearing adhesive face on the adherend side. Subsequently, from the top face side (the other release liner side), the PSA sheet was pressed with a finger, with the finger drawing a circle of 2 cm diameter to press-bond the PSA sheet onto the adherend while trapping air in the circle between the PSA sheet and the adherend. It was further press-bonded with a finger drawing circles to narrow down the circle and form a bubble in a prescribed size at the center of the circle. The bubble was flattened with a finger and the air release properties were sensibly evaluated. Based on Example 1, when the air release properties improved, it was graded "Good." The results are shown in Table 1.

[Table 1]

TABLE 1

|  | Ex. 1 | Ex. 2 | Ex. 3 |
| --- | --- | --- | --- |
| Ra of release liner's release face (μm) | 0.05 | 0.26 | 1.18 |
| Air release properties | — | Good | Good |

As shown in Table 1, good air release properties were obtained with the PSA sheets according to Examples 2 and 3 using a release liner having a release face's arithmetic average roughness Ra of 0.1 μm or greater, as compared to Example 1 using a release liner having an Ra value below 0.1 μm on the release face. This suggests that the contours indicated by the Ra at or above the prescribed value were transferred onto the surface of the coating layer opposing the release liner's release face, resulting in improved air release properties in the presence of the contours. It is noted that although not shown in particular, when the same test was performed with a release-linered double-faced PSA sheet having an overall thickness of 30 μm including a 13 μm thick PSA layer, the resulting air release properties showed similar improvement.

These results indicate that according to the PSA sheet disclosed herein, greater air release properties can be obtained.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
1A adhesive face
10 substrate film
20, 21, 22 PSA layers
20A PSA layer surface
30 coating layer
40 coating layer pattern (lattice pattern)
42 first stripe pattern
44 second stripe pattern
50 linearly extending part (band)
70 coating layer-bearing area
72 coating layer-free area
100, 101, 102 release liners
110 coating layer-bearing release liner
120 releasable support
120A release face

The invention claimed is:
1. A release-linered pressure-sensitive adhesive sheet comprising
a pressure-sensitive adhesive sheet and a release liner covering an adhesive face of the pressure-sensitive adhesive sheet, wherein
the pressure-sensitive adhesive sheet comprises a pressure-sensitive adhesive layer,
the pressure-sensitive adhesive sheet has a coating layer partially forming the adhesive face,
the pressure-sensitive adhesive layer has a thickness $T_A$ of 1 μm or greater and the coating layer has a thickness $T_C$, satisfying a $T_C/T_A$ ratio value of 0.75 or less, the release liner has an arithmetic average roughness of 0.1 μm or greater on the pressure-sensitive adhesive sheet side surface, the adhesive face has a 180° peel strength of 2 N/20 mm or greater, the peel strength is measured such that the adhesive face is peeled from a surface of a stainless steel plate in the 180° direction at a speed of 300 mm/min, the adhesive face has a liner peel strength less than 1 N/50 mm, and the release-linered pressure-sensitive adhesive sheet has a surface area ratio of the coating layer to the adhesive layer lower than 50%.

2. The release-linered pressure-sensitive adhesive sheet according to claim 1, wherein the release liner has an arithmetic average roughness greater than 1 μm on the pressure-sensitive adhesive sheet side surface.

3. The release-linered pressure-sensitive adhesive sheet according to claim 2, wherein the pressure-sensitive adhesive sheet further comprises a substrate film and the pressure-sensitive adhesive layer is provided at least on one face of the substrate film.

4. The release-linered pressure-sensitive adhesive sheet according to claim 2, wherein the coating layer thickness $T_C$ is 0.1 μm or greater and 5 μm or less.

5. The release-linered pressure-sensitive adhesive sheet according to claim 2, wherein the coating layer surface has an arithmetic average roughness greater than 1 μm.

6. The release-linered pressure-sensitive adhesive sheet according to claim 2, wherein
the coating layer has a lattice pattern,
the lattice pattern comprises two or more stripe patterns, with each stripe pattern formed of several linearly extending parts, and
in at least one of the two or more stripe patterns, the linearly extending parts are placed at an angle such that their length directions intersect edges of the width direction of the pressure-sensitive adhesive sheet, with each part reaching two edges of the adhesive face.

7. The release-linered pressure-sensitive adhesive sheet according to claim 1, wherein the pressure-sensitive adhesive sheet further comprises a substrate film and the pressure-sensitive adhesive layer is provided at least on one face of the substrate film.

8. The release-linered pressure-sensitive adhesive sheet according to claim 7, wherein the coating layer thickness $T_C$ is 0.1 μm or greater and 5 μm or less.

9. The release-linered pressure-sensitive adhesive sheet according to claim 1, wherein the coating layer thickness $T_C$ is 0.1 μm or greater and 5 μm or less.

10. The release-linered pressure-sensitive adhesive sheet according to claim 1, wherein the coating layer surface has an arithmetic average roughness greater than 1 μm.

11. The release-linered pressure-sensitive adhesive sheet according claim 1, wherein
the coating layer has a lattice pattern,
the lattice pattern comprises two or more stripe patterns, with each stripe pattern formed of several linearly extending parts, and
in at least one of the two or more stripe patterns, the linearly extending parts are placed at an angle such that their length directions intersect edges of the width direction of the pressure-sensitive adhesive sheet, with each part reaching two edges of the adhesive face.

12. The release-linered pressure-sensitive adhesive sheet according to claim 1, wherein the surface of the coating layer has an arithmetic average roughness greater than 1 μm or greater and 5 μm or less.

13. The release-linered pressure-sensitive adhesive sheet according to claim 1, wherein the pressure-sensitive adhesive sheet comprises a pressure-sensitive adhesive layer having a thickness of 7 μm or less.

14. The release-linered pressure-sensitive adhesive sheet according to claim 1, wherein the pressure-sensitive adhesive sheet comprises a pressure-sensitive adhesive layer and a substrate film to support the pressure-sensitive adhesive layer, and the substrate film has a thickness smaller than 10 μm.

15. The release-linered pressure-sensitive adhesive sheet according to claim 1, wherein the overall thickness of the pressure-sensitive adhesive sheet is 15 μm or less.

16. The release-linered pressure sensitive adhesive sheet according to claim 1, wherein the adhesive face has a 180° peel strength of 5 N/20 mm or greater, the peel strength is measured such that the adhesive face is peeled from a surface of a stainless steel plate in the 180° direction at a speed of 300 mm/min.

17. The release-linered pressure-sensitive adhesive sheet according to claim 1, wherein the release liner has a release layer on a surface of a liner substrate, and
the release layer is formed with a silicone-based release agent.

18. The release-linered pressure-sensitive adhesive sheet according to claim 1, wherein the coating layer surface has an arithmetic average roughness greater than 1 μm and 5 μm or less, and
the release liner has the arithmetic average roughness greater than 1 μm and 5 μm or less.

* * * * *